United States Patent
Ronketti et al.

(10) Patent No.: US 9,596,347 B2
(45) Date of Patent: Mar. 14, 2017

(54) METHOD AND SYSTEM FOR PROVIDING A HOLD MEDIA SERVICE

(71) Applicant: Verizon Patent and Licensing Inc., Arlington, VA (US)

(72) Inventors: Neil Ronketti, Cambs (GB); Jan Marcel Rijnders, Leiden (NL); Christopher A Kimm, Morristown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 204 days.

(21) Appl. No.: 14/461,116

(22) Filed: Aug. 15, 2014

(65) Prior Publication Data
US 2016/0050312 A1 Feb. 18, 2016

(51) Int. Cl.
*H04M 3/42* (2006.01)
*H04L 29/06* (2006.01)
*H04M 3/428* (2006.01)
*H04W 4/16* (2009.01)

(52) U.S. Cl.
CPC .......... *H04M 3/4285* (2013.01); *H04W 4/16* (2013.01); *H04M 3/42102* (2013.01); *H04M 2203/255* (2013.01)

(58) Field of Classification Search
CPC ................................................. H04L 29/08108
USPC ........................................... 455/414.1, 414.3
See application file for complete search history.

(56) References Cited

U.S. PATENT DOCUMENTS

| | | | | |
|---|---|---|---|---|
| 2006/0276174 A1* | 12/2006 | Katz | ................. | G06F 17/30864 455/410 |
| 2007/0004384 A1* | 1/2007 | Anupam | ............. | H04M 3/4285 455/414.1 |
| 2012/0225639 A1* | 9/2012 | Gazdzinski | ............ | G06Q 10/08 455/410 |

* cited by examiner

Primary Examiner — Joshua Schwartz

(57) ABSTRACT

An approach is provided for determining that a device has been placed on a hold status during a communication session, wherein hold media is presented to the device during the hold status. The approach involves determining that the device and/or the communication session is registered for a hold music service that provides media from a content provider. The approach also involves requesting personalized media from the content provider. The approach further involves presenting the personalized media to the device as the hold media during the hold status.

20 Claims, 13 Drawing Sheets

METHOD AND SYSTEM FOR PROVIDING A HOLD MEDIA SERVICE

BACKGROUND INFORMATION

Numerous callers are placed on hold during a communication session, this is an unfortunate but unavoidable part. Presently, callers dialing into a communication session are played music during the hold period by the service provider without due consideration to the preferences of the callers. Since callers spend a great deal of time listening to music while on hold, this experience should be made more productive and pleasurable. In view of the fact that callers can benefit from the information received during the hold period, a process of provisioning media of interest to callers while on hold may provide tangible business benefits as well as enhance user experience.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for causing an optimization of media services played during the hold period of a communication session with the preference information of individual users, is described. In the following description, for the purposes of explanation, numerous specific details are set forth in order to provide a thorough understanding of the present invention. As is well known, the present invention may be practiced without these specific details or with an equivalent arrangement. In other instances, well-known structures and devices are shown in block diagram form in order to avoid unnecessarily obscuring the present invention.

As discussed, callers dialing into a call center are played music during their waiting period until an operator becomes available. The music played during the waiting period does not offer any options for music selection. A caller may feel that the hold period drags on forever because the hold music is terrible, therefore terminating the call (e.g. callers may hang up annoyed and may never call back). In one scenario, user Z spends about 15 minutes a day on hold during a communication session. Therefore, user Z listens to music chosen by the service provider for 15 minutes every day. Since, the hold music does not suit his musical liking, this experience may be negative and may not incentivize the user to make future calls. Surely, the service provider may lose user Z as a customer. Given that service providers spend tons of capital on inducing customers to call, such mishandling of incoming calls negates the effort to maximize customers. Therefore, the system 100 tailors the media played to a caller on hold per their music preference. The media played while the callers are placed on hold are media favored by the callers.

In one embodiment, the system 100 molds hold music per customer preference to build a better customer experience. In one scenario, the system 100 may be a personalized system that tracks the listening habits of a user and tailors the music stream to the preference of the user. In another scenario, the system 100 may be an adaptive system that learns the listening habit of an individual user and suggests new content and/or skips contents. In one scenario, the content may be any type of content that interests a user, for example, music, videos, images, stock market prices, news updates, etc. In another scenario, a user may have his content saved in one or more UE 101 which may be accessed by the selection platform 115. In another scenario, a user may save the content in a cloud, and the user may link his phone number to the cloud, thereby making it accessible to the selection platform 115 to access the content information. For example, a user while listening to music in a third party media streaming service skips few songs, the system 100 may track the action and may not play the skipped songs when the user is placed on hold during a future communication session.

Figure 1:
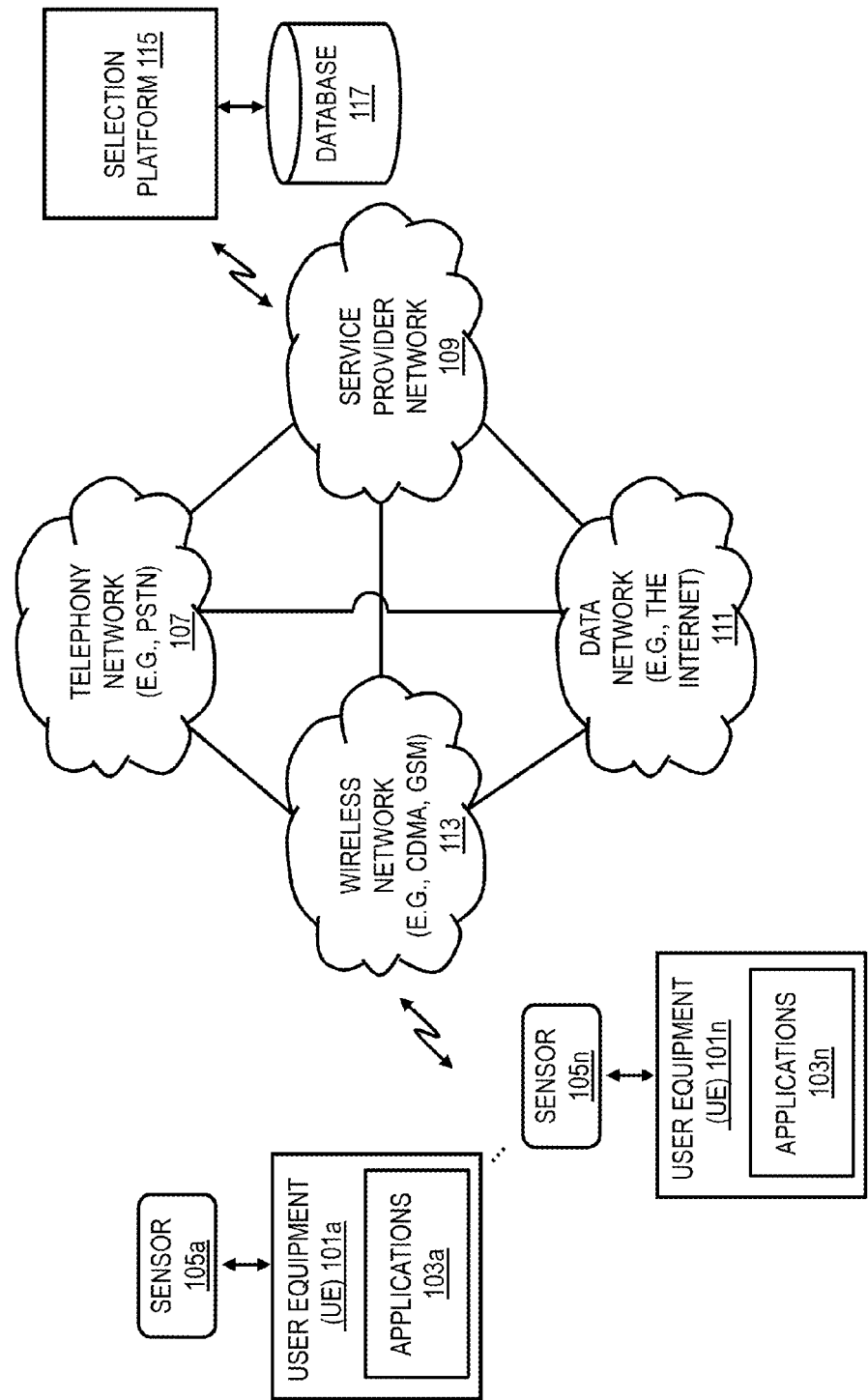
FIG. 1 is a diagram of a system capable of causing an optimization of media services played during the hold period of a communication session with the preference information of individual users, according to one embodiment.

As shown in FIG. 1, the system 100 comprises of user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the selection platform 115 via networks 107-113. In one embodiment, the selection platform 115 performs one or more functions associated with optimizing the media services played during the hold period of a communication session with the preference information of individual users.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that may perform various processes and/or functions at the UE 101. In one embodiment, the applications 103 may be content provisioning (e.g. audio, video, images) services, camera/imaging application, media player applications, social networking applications, location-based service applications, calendar applications, and the like. In one embodiment, one of the applications 103 at the UE 101 may act as a client for the selection platform 115 and may perform one or more functions associated with the functions of the selection platform 115 by interacting with the selection platform 115 over the network 107-113.

By way of example, the sensors 105 may be any type of sensor. In certain embodiments, the sensors 105 may include, for example, a network detection sensor for detecting wireless signals or receivers for different short-range communications (e.g., Bluetooth, Wi-Fi, Li-Fi, near field communication etc.), a camera/imaging sensor for gathering image data, an audio recorder for gathering audio data, a global positioning sensor for gathering location data (e.g., GPS), and the like. In one scenario, the sensors 105 may include audio sensors (e.g., microphone) for voice recognition. In one example embodiment, a user may be on hold and is listening to hold music during a communication session. The user has the ability to control the music stream (e.g. reply the track or skip the track) via a speech based interaction. The voice command given by a user is identified by sensors 105 by means of voice recognition mechanism. In one scenario, near field communications on the UE 101 makes it possible to identify the user, and automatically stream content to the surrounding environment, for example, streaming personalized music into an elevator when there is a single occupant, or to a hotel room upon initial check-in.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

In one embodiment, the selection platform 115 may be a platform with multiple interconnected components. The selection platform 115 may include multiple servers, intelligent networking devices, computing devices, components and corresponding software for causing an optimization of media services played during the hold period of a communication session with the preference information of individual users.

In one embodiment, the selection platform 115 may determine that a device has been placed on a hold status during a communication session. Then, the selection platform 115 may present hold media to the device during the hold status. In another embodiment, the selection platform 115 may determine that a device and/or the communication session is registered for a hold music service that provides media from a content provider. In a further embodiment, the selection platform 115 may request personalized media from the content provider, and present the personalized media to the device as the hold media during the hold status. In one example embodiment, user Z spends about 15 minutes a day on hold during a communication session. Therefore, the selection platform 115 may select media based on preference of user Z, ensuring that user Z listens to music of his choice for 15 minutes every day while on hold. In one scenario, the selection platform 115 may gather preference information about user Z from various social networking services, content (e.g., text, images, etc.) provisioning services, storage services, contextual information determination services, etc. In another scenario, the selection platform 115 may gather preference information about user Z by connecting with various online services that reflect interests and/or activities of users, for example, representations of each user (e.g., a profile), his/her social links, and a variety of additional information. Then, the selection platform 115 may request the media from the third party media streaming service to play the media to user Z while on hold.

In one embodiment, the selection platform 115 may access profile information of a user associated with at least one registered device from a content provider to identify user preference information. The user preference information includes music preference information, video preference information, authentication mechanism preference information, or a combination thereof. Then, the selection platform 115 may request a media based on user preference information, and then forward the media to at least one registered device during the hold period of a communication session. In another embodiment, the selection platform 115 is an adaptive system, and learns from a user's choice and feedback. The selection platform 115 may monitor user activity (e.g. skipping and/or replaying of a media) and causes an updating of user preference information based on the interaction.

In one embodiment, the selection platform 115 may include or have access to database 117 to access or store any kind of data, such as user preference information, historical user information, contextual information, etc. The data stored in the database 117 may, for instance, be provided by the UE 101, any third party content provider, etc. In one scenario, the database 117 may store profile information for each user, wherein the profile information contains their phone numbers, social media user identifier, preference information, PIN code information, etc. In one embodiment, the database 117 may manage access to a central repository of data, and offer a consistent, standard interface to data.

Figure 2:
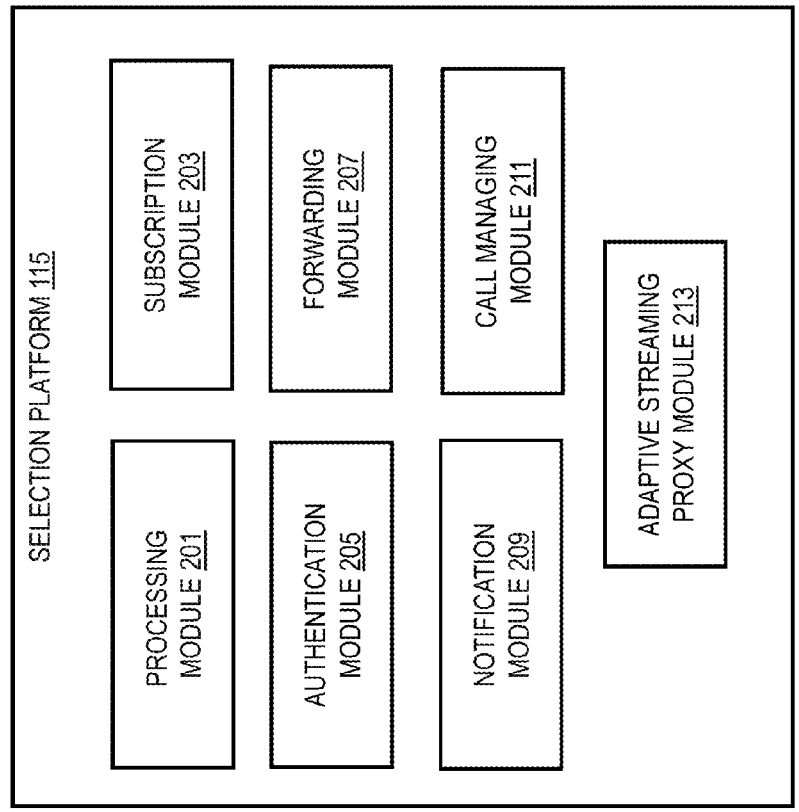
FIG. 2 is a diagram of the components of the selection platform 115, according to one embodiment.

FIG. 2 is a diagram of the components of the selection platform 115 for causing an optimization of media services played during the hold period of a communication session with the preference information of individual users, according to one embodiment. The selection platform 115 may include a processing module 201, a subscription module 203, an authentication module 205, a forwarding module 207, a notification module 209, a call managing module 211, and an adaptive streaming proxy (ASP) module 213. It is contemplated that the functions of these components may be combined in one or more components or performed by other components of equivalent functionality.

In one embodiment, the processing module 201 may process one or more registered devices in a communication session to determine that at least one registered device has been placed on hold. Then, the processing module 201 may access profile information of a user associated with at least one registered device from a content provider (e.g. a third party media streaming service etc.). Subsequently, the processing module 201 may process the profile information of the user associated with at least one registered device to identify user preference information.

In one embodiment, the subscription module 203 may query the ASP module 213 to determine subscription of an incoming phone number to an optimized media on hold service, a content provider, or a combination thereof. In one scenario, a user may enter a subscription process through a portal offered by a content provider (e.g. a third party media streaming service etc.) via application 103 on a UE 101. The portal collects user information, for example, registered email address, registered phone number, billing details, preferences for content type, and whether the user wishes to activate a PIN challenge for each call to an OHMS enabled service. Once the data has been collected, a query may be made to the ASP module 213 to ensure that the phone number is not registered to another content provider. If it is, a warning may be issued that a user is about to overwrite the subscription to another service, and that they may need to cancel the service with the other service provider. The active service name may be obtained from the existing record. However, there will be no attempt to broker communications between the two third party media streaming services to facilitate the cancellation of existing contract. In another embodiment, if there is no existing record on the ASP module 213, or the user selects to overwrite the one that is there, a record will be written to the ASP database containing the user information. An identifier will also be written, indicating the name of the service which is now active.

In one embodiment, the authentication module 205 may cause an association between a registered phone number with a PIN number, user preference information, or a combination thereof. In one scenario, user preference information includes music preference information, video preference information, authentication mechanism preference information, or a combination thereof. In another embodiment, the authentication module 205 may work with the notification module 209 to cause a notification in at least one registered device to enter a PIN code to activate OHMS. In one scenario, a user may enter PIN code via a touch based interaction, a speech based interaction, or a combination thereof. In one scenario, a user can bypass the authentication mechanism to receive standard hold media service available to non-subscribers. In a further embodiment, bypassing the PIN authentication process and requesting media from a content provider is based on a determination that an incoming phone number is configured to OHMS.

In one embodiment, the forwarding module 207 may request a media from a content provider. Then, the forwarding module 207 may relay the media to at least one registered device during the hold period of a communication session. In one scenario, if a user has subscription to a third party media streaming service. Then, the user preference information and other content information may be retrieved from the third party media streaming service into the OHMS. The OHMS may optimize the media services in accordance with user preferences, and play the media while a user is placed on hold during a conference session. In one embodiment, the forwarding module 207 pauses a media based on a determination that a user is no longer on hold. Further, the forwarding module 207 may play the media from where it was paused based on a determination that a user has been placed on hold again.

In one embodiment, the notification module 209 may cause a notification of at least one challenge to at least one device, for example, entering a PIN code to activate a service. In another embodiment, the notification module 209 may cause a notification to at least one registered device of overwriting the subscription based on a determination that a phone number is already registered with another content provider.

In one embodiment, the call managing module 211 may manage incoming calls to a particular number. The call managing module 211 tracks active voice over internet protocol (VoIP) network components including phone numbers, gateways, conference bridges, transcoding resources, and voicemail boxes among others. In one embodiment, to support OHMS, the call manager is capable of the following functions:

Passing the incoming telephone number to the ASP module 213;
Issuing a challenge to the listener to enter a PIN number;
Passing any recorded voice commands or keypresses to the ASP module 213 via a published application programming interface (API);
Requesting an audio stream from the ASP; and
Passing the audio stream from the ASP to the listener.

In one scenario, when a user connects to the call managing module 211, a query is made against the ASP module 213 to determine if the incoming phone number is recognized as a valid number for provisioning OMHS. If not, the call processing continues as normal. In another scenario, if a phone number is recognized, the call manager may query the ASP module 213, and issue a challenge to the user to enter their PIN number to receive OMHS. Once a challenge is issued, but is rejected by a user by pressing a pre-defined key to bypass the challenge, the call proceeds as normal. If the challenge is issued and accepted, the PIN is forwarded to the ASP module 213, and if authentication is successful, the call manager may request a stream from the ASP module 213 based on the users preferences, and may proceed to direct that stream to the listener. In another scenario, if a user has chosen not to go through the PIN authentication process, the call manager may bypass the challenge/response stage, and query the ASP module 213 to determine whether OHMS is configured for the incoming phone number. If so, the media stream will be requested from the ASP module 213, else normal call processing continues.

In one embodiment, the call managing module 211 may cause a skipping, a replaying, or a combination thereof of a media item via a touch based interaction, a speech based interaction, or a combination thereof. In one scenario, in any time the listener is receiving an OHMS optimized stream, they will have the option to press a pre-defined key on their respective UE 101 to either skip the current selection, or press another key to replay it. This information may be fed back to the ASP module 213 to update the user preferences. In addition, voice command given by a user may be understood by the call manager via voice recognition mechanisms. For example, a user may utter 'skip track' to play the next track in the sequence, or say 'repeat track' to repeat the last played track, or 'play track' to play a known track from the service provider. In one scenario, the voice commands may be interpreted on the call manager, and then the relevant API call issued to the ASP module 213 to action the command. These commands are not restricted purely to the streaming of musical content from the third party. For example, a user may provide command to the ASP module 213 to stream the news headlines or the weather in a particular location. In another embodiment, the call managing module 211 may cause an updating of user preference information based on the interaction. In one scenario, once a call has been answered, normal call processing continues, and the interaction with the ASP module 213 is suspended. In another scenario, if the same call is placed on hold again, the suspended stream is restarted, rather than starting the whole process over again. In a further embodiment, the call managing module 211 may cause a restarting of the process for optimized media on hold service upon transferring the communication session to another phone number. In one scenario, if a call manager is directed to transfer the call to another number, the process flow is restarted. This ensures an unregistered number or user does not access the OHMS service through the mechanism of starting the call, and then transferring it to an unregistered number.

In one embodiment, the ASP module 213 stores phone numbers and data for each registered user, including PIN numbers, user preferences, available streaming services in order of preference, etc. In another embodiment, the ASP module 213 may open a stream to a content provider based on a request from a call managing module 211. Then, the ASP module 213 may deliver the content to the call managing module 211 for onward delivery to the listener based on the listening profile of the user, as determined by the content provider.

The above presented modules and components of the selection platform 115 can be implemented in hardware, firmware, software, or a combination thereof. Though depicted as a separate entity in FIG. 1, it is contemplated that the selection platform 115 may be implemented for direct operation by respective UE 101. As such, the selection platform 115 may generate direct signal inputs by way of the operating system of the UE 101 for interacting with the applications 103. In another embodiment, one or more of the modules 201-213 may be implemented for operation by respective UEs, as a selection platform 115. Still further, the selection platform 115 may be integrated for direct operation with services 107-13, such as in the form of a widget or applet, in accordance with an information and/or subscriber sharing arrangement. The various executions presented herein contemplate any and all arrangements and models.

Figure 3:
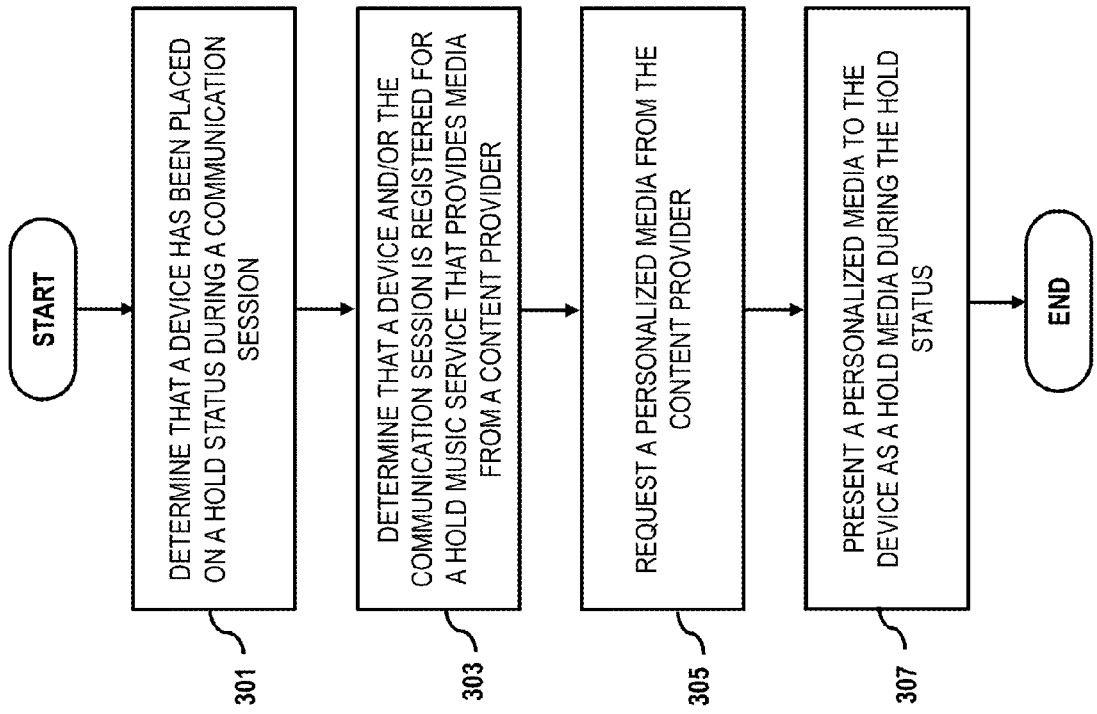
FIG. 3 is a flowchart of a process for determining that a device placed on hold is registered for a hold music service that provides media from a content provider, and presenting personalized media to the device, according to one embodiment.
Figure 12:
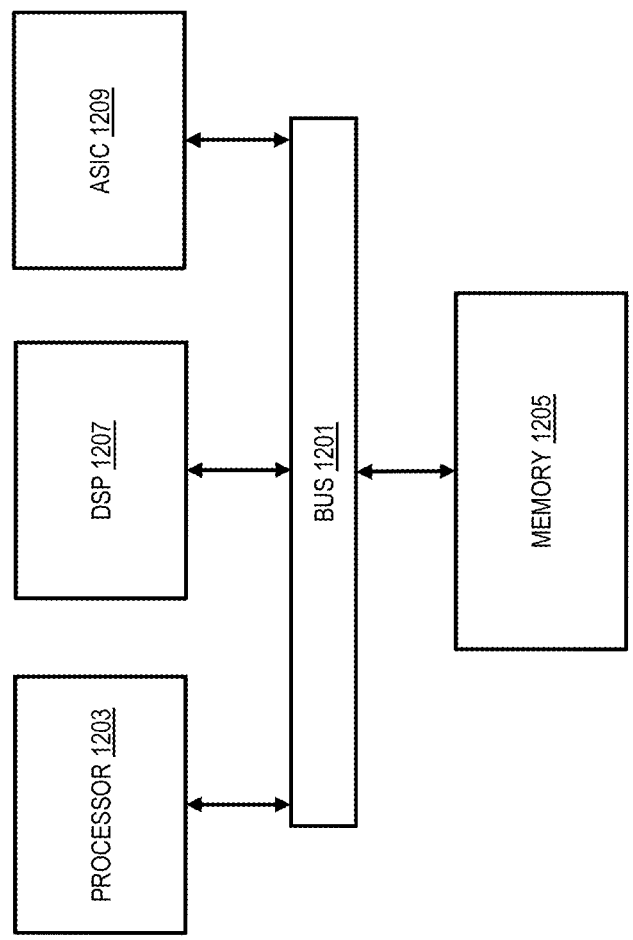
FIG. 12 is a diagram of a chip set that can be used to implement various exemplary embodiments.

FIG. 3 is a flowchart of a process for determining that a device placed on hold is registered for a hold music service that provides media from a content provider, and presenting personalized media to the device, according to one embodiment. In one embodiment, the selection platform 115 performs the process 300 and is implemented in, for instance, a chip set including a processor and a memory as shown in FIG. 12.

In step 301, the selection platform 115 may determine that a device has been placed on a hold status during a communication session, wherein hold media is presented to the device during the hold status. In one scenario, callers Z and K dial into a communication session separately, and both are placed on hold. Then, the selection platform 115 may determine that callers Z and K are placed on hold, whereupon hold media is played to both the callers. The hold media played to the callers Z and K may be their personalized to the media preference, wherein different hold media may be presented to callers Z and K. Caller Z may hear jazz music by his favorite artist whilst caller K may hear classical music from her favorite artist.

In step 303, the selection platform 115 may determine that the device, the communication session, or a combination thereof is registered for a hold music service that provides media from a content provider. In one scenario, the selection platform 115 may determine that a device associated with at least one caller placed on hold during a communication session is registered for a hold music service that provides media from a content provider. In one example embodiment, the selection platform 115 may retrieve profile information of the user associated with the registered device from a third party media streaming services. In another scenario, the selection platform 115 may determine whether the communication session that one or more users are dialing in is registered for a hold music service that provides media from a content provider. In one example embodiment, one or more users may dial into a conference session that is registered with a service that retrieves media content for individual caller from a third party media streaming service.

In step 305, the selection platform 115 may request a personalized media from the content provider. In one scenario, the selection platform 115 may process the profile information of the callers from the content provider to identify user preference information. Then, the selection platform 115 may request the content from the content provider.

In step 307, the selection platform 115 may present the personalized media to the device as the hold media during the hold status. In one scenario, the selection platform 115 may cause a forwarding of the personalized content received from the content provider to the registered device placed on hold during a communication session.

Figure 4:
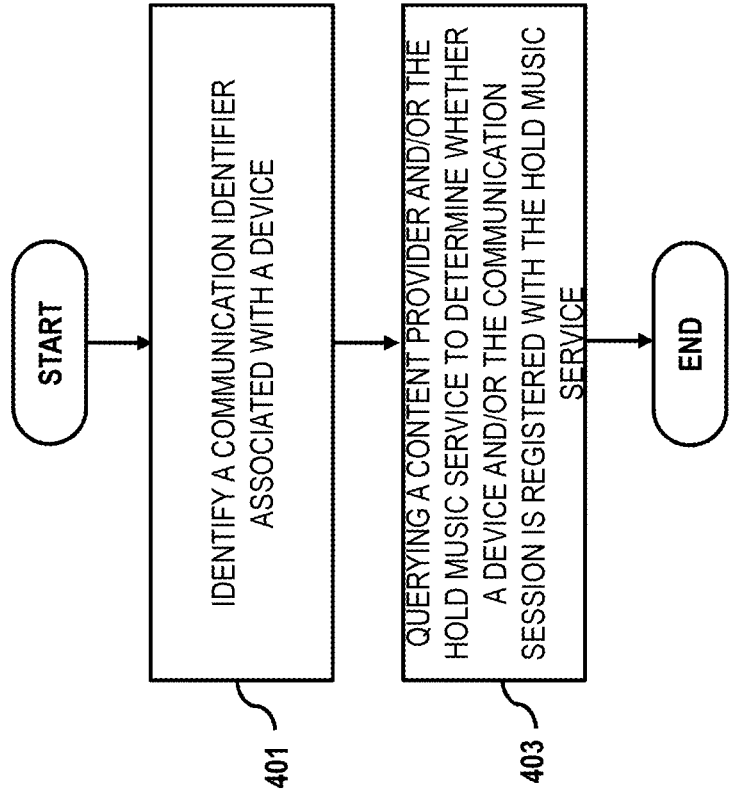
FIG. 4 is a flowchart of a process for determining registration information for at least one device based on communication identifier associated with a device, according to one embodiment.

FIG. 4 is a flowchart of a process for determining registration information for at least one device based on communication identifier associated with a device, according to one embodiment. In one embodiment, the selection platform 115 performs the process 400 and is implemented in, for instance, a chip set including a processor and a memory as shown in FIG. 12.

In step 401, the selection platform 115 may identify a communication identifier associated with the device. In one scenario, a communication identifier may be a phone number, a mobile directory number (MDN), device ID, a media access control (MAC) address, or other uniquely identifiable piece of information (e.g. such as the IMEI of a smartphone, or tablet), or a combination thereof. In this instance, a user may register with a third party streaming service (either through a portal or through an application 103 on the UE 101 that can automatically obtain the MAC address or other unique identifier). The record stored on the Adaptive Streaming Proxy (ASP) may contain this unique identifier. In such manner, a user may also be identified through this unique identifier on their UE 101, and a service is not only tied to a specific phone number. In one embodiment, the selection platform 115 may determine that the device is registered with the hold music service, the requesting of the personalized media, the presenting of the personalized media, or a combination thereof is based on the communication identifier.

In step 403, the selection platform 115 may query the content provider, the hold music service, or a combination thereof to determine whether the device, the communication session, or a combination thereof is registered with the hold music service. In one scenario, user H dials into a conference session and is placed on hold. Then, the selection platform 115 may query the third party media streaming services that user H is subscribed with for registration information on hold music services. On the other hand, the selection platform 115 may directly query the hold music service to determine registration information for UE 101 of user A.

Figure 5:
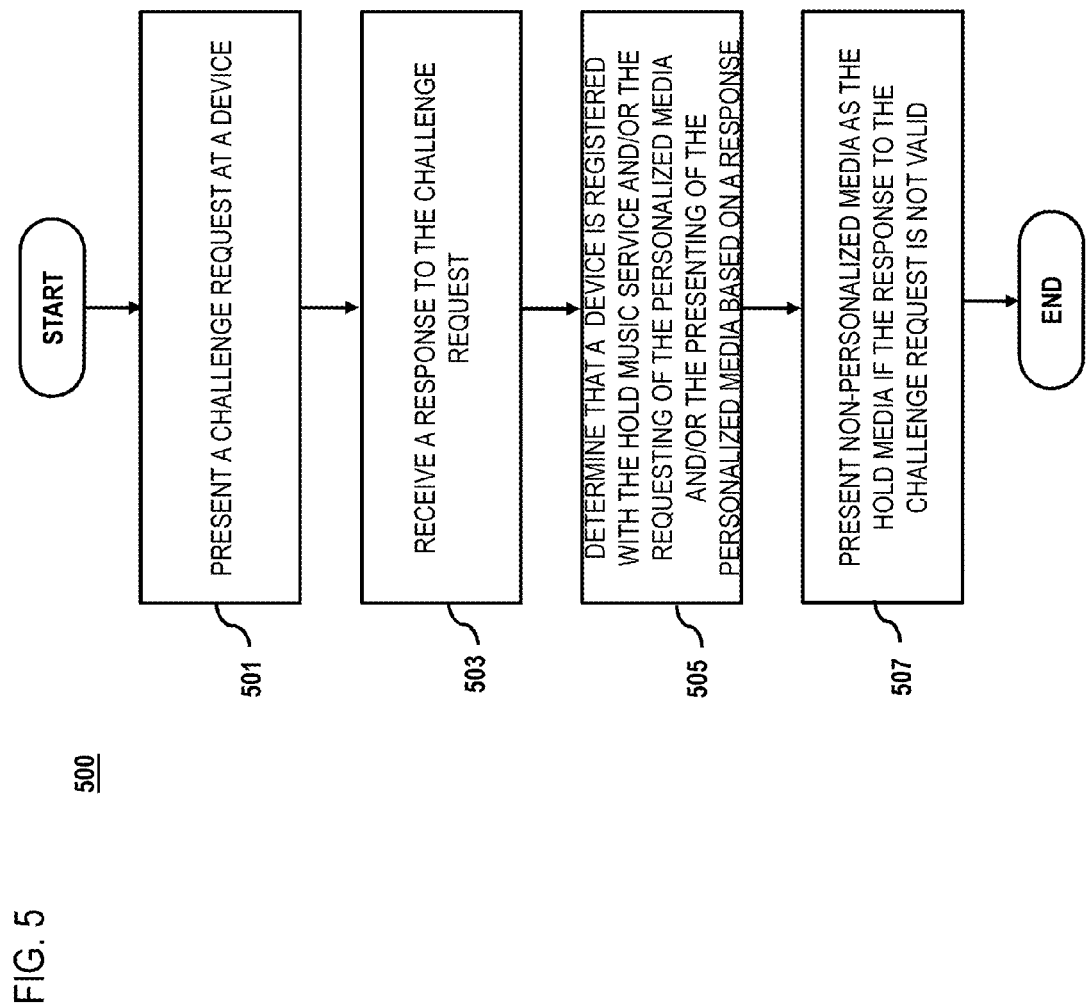
FIG. 5 is a flowchart of a process for presenting personalized media as the hold media if the response to the presented challenge is valid, according to one embodiment.

FIG. 5 is a flowchart of a process for presenting personalized media as the hold media if the response to the presented challenge is valid, according to one embodiment. In one embodiment, the selection platform 115 performs the process 500 and is implemented in, for instance, a chip set including a processor and a memory as shown in FIG. 12.

In step 501, the selection platform 115 may present a challenge request at the device. In one scenario, the selection platform 115 may cause a notification in a device of a user placed on hold to enter PIN code to activate an optimized media on hold service.

In step 503, the selection platform 115 may receive a response to the challenge request. In one scenario, a user on hold may enter the PIN code via a touch based interaction or a speech based interaction.

In step 505, the selection platform 115 may initiate the determining that the device is registered with the hold music service, the requesting of the personalized media, the presenting of the personalized media, or a combination thereof based on the response.

In step 507, the selection platform 115 may present non-personalized media as the hold media if the response to the challenge request is not valid. In one scenario, a user may bypass the authentication mechanism to receive standard hold media service available to non-subscribers.

Figure 6:
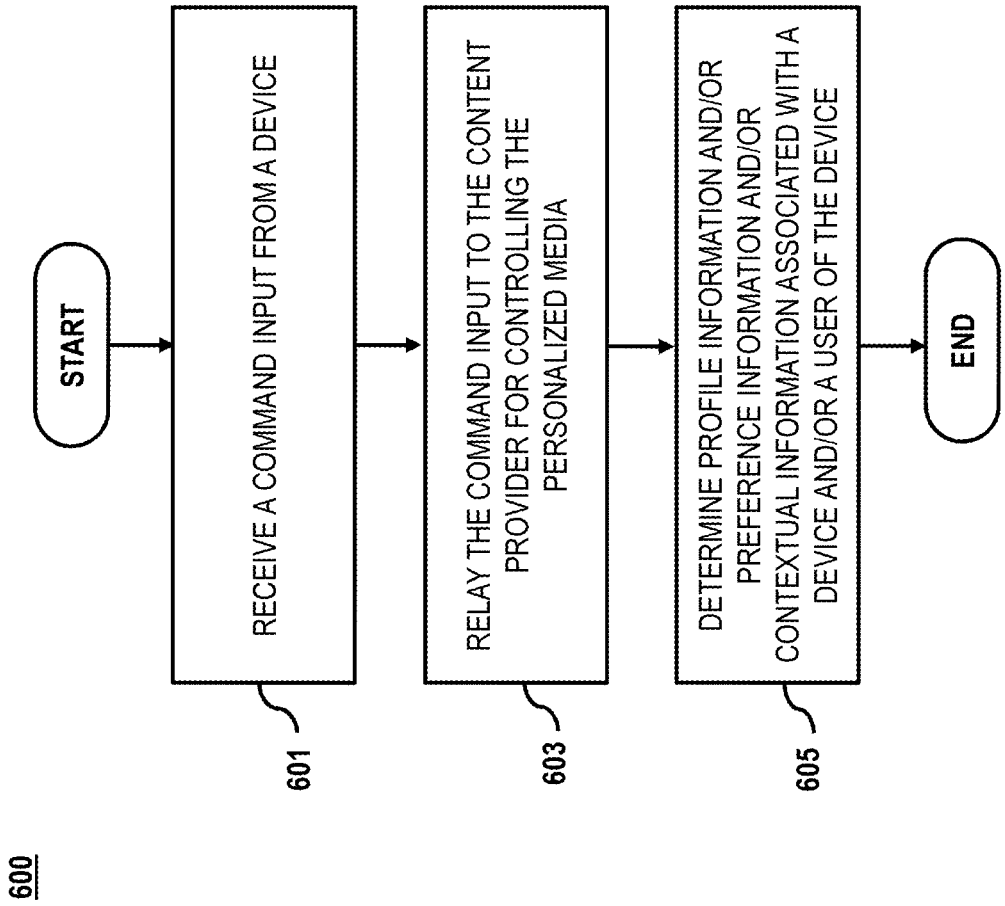
FIG. 6 is a flowchart of a process for relaying the received command input from a device to the content provider for controlling the personalized media, according to one embodiment.

FIG. 6 is a flowchart of a process for relaying the received command input from a device to the content provider for controlling the personalized media, according to one embodiment. In one embodiment, the selection platform 115 performs the process 600 and is implemented in, for instance, a chip set including a processor and a memory as shown in FIG. 12.

In step 601, the selection platform 115 may receive a command input from the device. In one embodiment, the command input is received as a voice input, a keypress input, a touch input, a gesture input, or a combination thereof.

In step 603, the selection platform 115 may relay the command input to the content provider for controlling the personalized media. In one scenario, a command input may involve pausing media content, skipping media content, replaying of media content, etc. In another scenario, the command input of the user may be used for the updating of user preference information.

In step 605, the selection platform 115 may determine profile information, preference information, contextual information, or a combination thereof associated with the device, a user of the device, or a combination thereof. In one embodiment, the personalized media is based on the profile information, the preference information, the contextual information, or a combination thereof.

Figure 7:
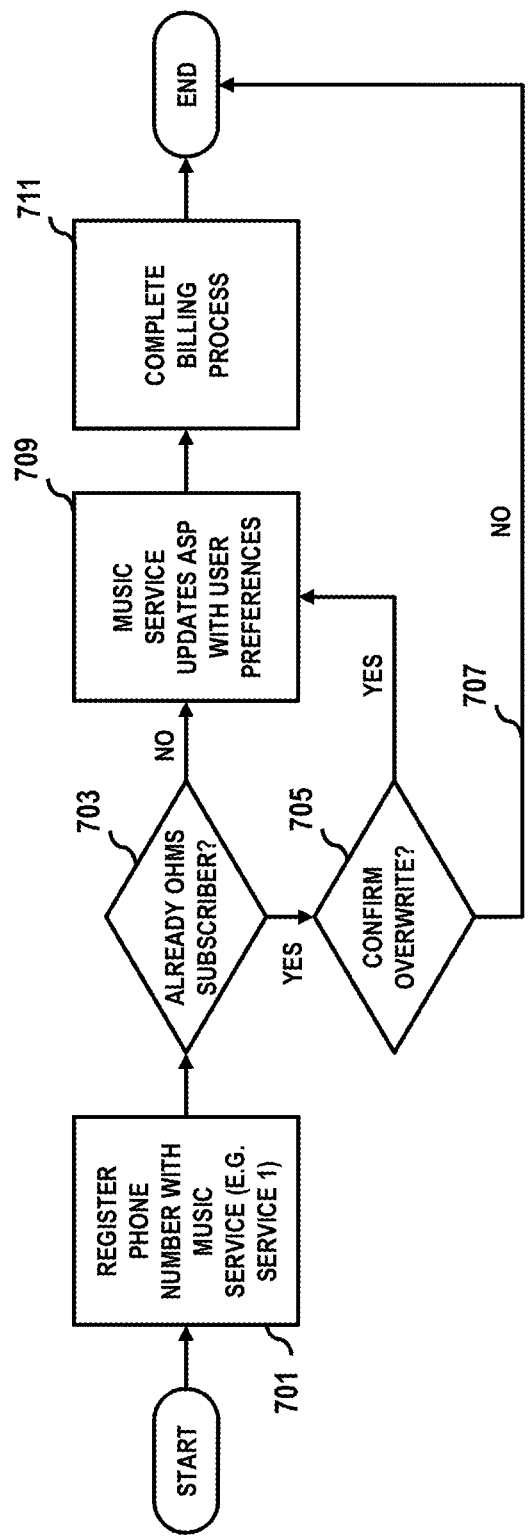
FIG. 7 is a flow diagram that represents the subscription process for the optimized hold music service (OHMS), according to one example embodiment.

FIG. 7 is a flow diagram that represents the subscription process for the optimized hold music service (OHMS), according to one example embodiment. In one scenario, a user subscribes to OHMS through a third party media streaming service. This process involves a user registering his phone number with a third party media streaming service [701]. The phone number to which the service applies is stored alongside a PIN number and a set of user preference information (e.g. the type of music a user likes to listen while on hold, user preference on additional authentication mechanism for every call made to a phone number subscribed to OHMS etc.). Then, the selection platform 115 may verify whether a user is subscribed to OHMS [703]. If a user is already subscribed to OHMS, the selection platform 115 may either override the existing details [705] or skip to the end of the subscription process [707]. If a user chooses to override or is not a subscriber to OHMS, the selection platform 115 may write the records for the individual user comprising of a phone number, user preference information, PIN number etc. [709]. Subsequently, a user may enter billing information, unless the user is a paying subscriber to a third party media streaming service [711]. If so, the user needs to accept new terms indicating changes to his/her service [711].

Figure 8:
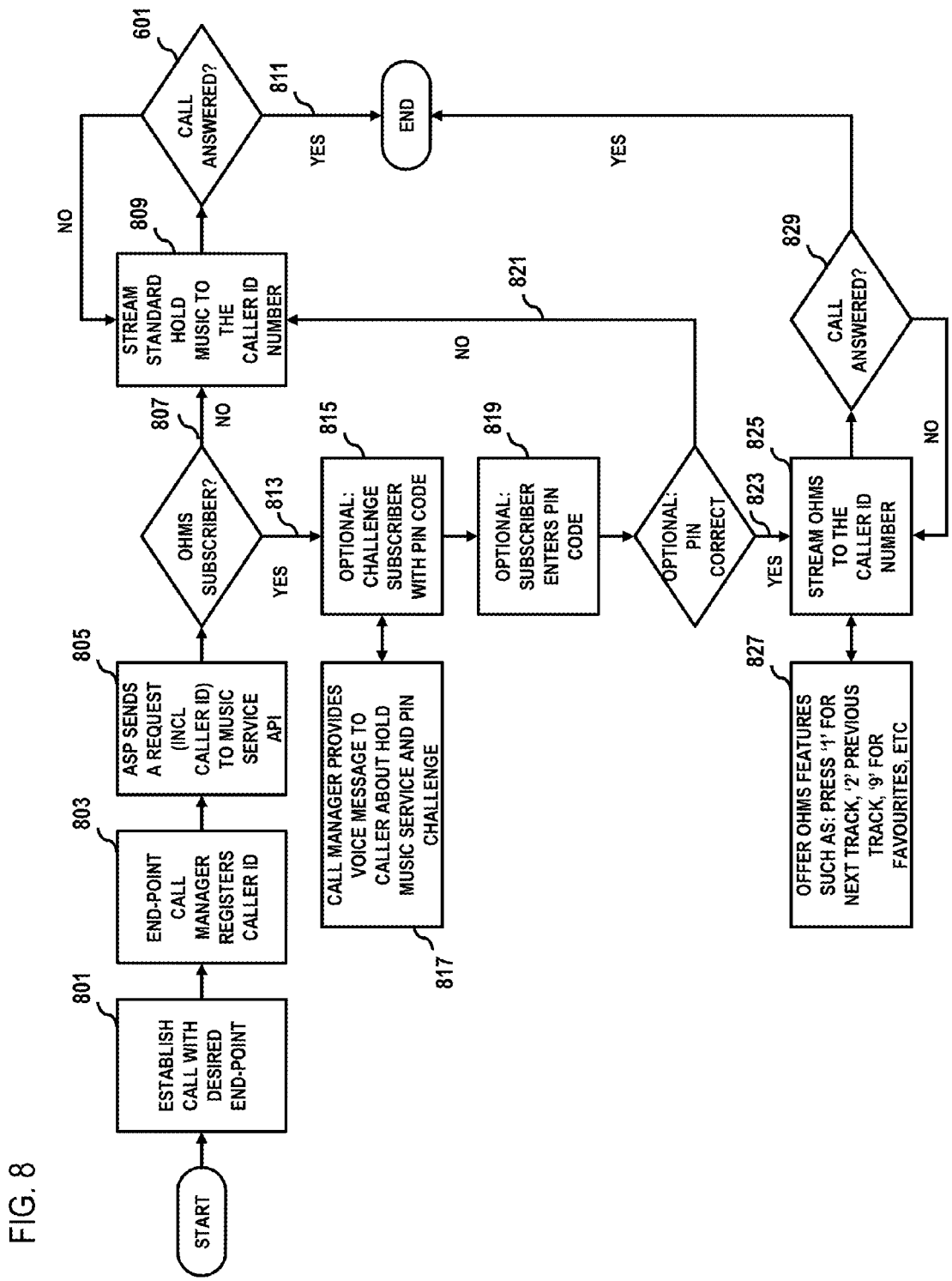
FIG. 8 is a flow diagram that represents the activation process for the optimized hold music service (OHMS), according to one example embodiment.

FIG. 8 is a flow diagram that represents the activation process for the optimized hold music service (OHMS), according to one example embodiment. In one scenario, a user may call a number that supports OHMS [801], whereupon the communication session manager may register the identification information of the users' UE 101 [803]. Then, the adaptive streaming proxy (ASP) may query the third party media streaming service to ascertain the registration and the subscription information to OHMS for a phone number associated with the users' UE 101 [805]. If a phone number is not subscribed to OHMS [807], standard hold music is played [809] until the call is answered [811]. On the other hand, if the number is recognized as a subscriber to OHMS [813], then optional challenges may be implemented [815]. In one scenario, a call manager may provide voice message to a caller with regards to the hold music service and the PIN challenge [817]. Then, a user may be presented with an option (either by key-press or voice recognition) to enter their PIN code to access OHMS and activate their chosen preferences [819]. In one scenario, a user may choose to bypass this option and may receive standard hold music available to non-subscribers [821, 809]. In another scenario, if the entered PIN information is incorrect, the user may receive standard hold music available to non-subscribers [821, 809]. This authentication mechanism ensures that should an unregistered user calls into the service from a registered phone number, the unregistered user does not receive the personalized content of the registered user. Nevertheless, this authentication stage can be made optional if the user is certain that the phone number registered with the third party media streaming service is not available to other users (for example, a UE 101 that is password protected). Alternatively, if a user accepts and succeeds in the challenge [823], then the music stream from the third party media service provider is delivered to the users' UE 101 [825]. Consequently, the process for anticipating keypress or voice commands begins [827]. If at any time the call is answered it goes back to normal processing mode [829].

Figure 9:
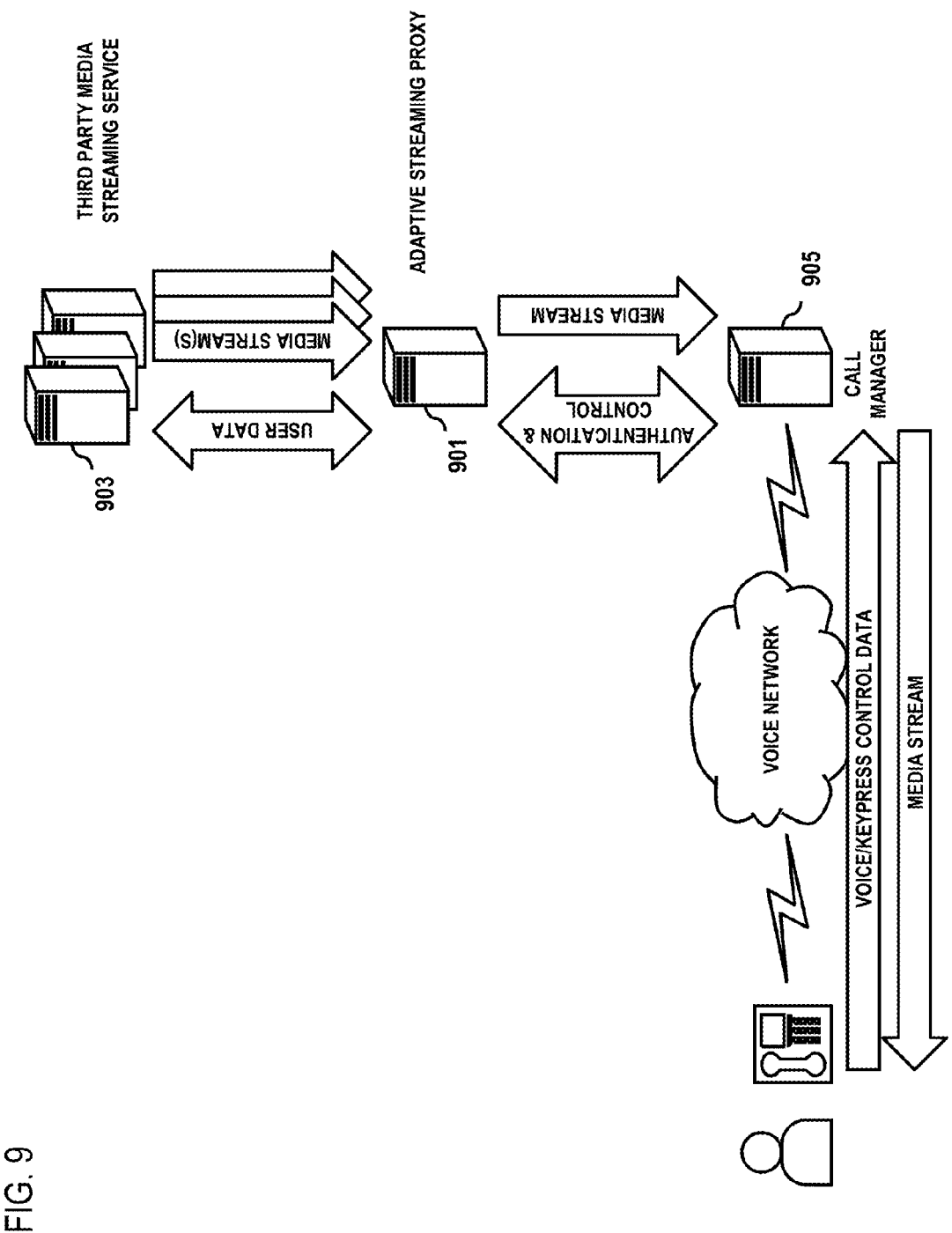
FIG. 9 is a diagram that represents the function of the adaptive streaming proxy (ASP), according to one example embodiment.

FIG. 9 is a diagram that represents the function of the adaptive streaming proxy (ASP), according to one example embodiment. In one embodiment, the ASP [901] may store phone numbers and data for each registered user, including PIN numbers, user preferences, etc. In another embodiment, the ASP [901] may open a stream to the preferred third party media streaming service [903] based on a request from a call manager [905]. Then, the ASP [901] may deliver the content to the call manager [905] for onward delivery to the listener based on the listening profile of the user, as determined by the third party media streaming service [903]. In one scenario, the ASP [901] attends to one or more requests from the call manager [905], wherein the call manager [905] delivers the phone number of the incoming call. Subsequently, the ASP [901] may open a stream to the preferred third party media streaming service [903] based on the request. The preferred third party media streaming service [903] may respond to the request with subscription information to the OHMS for the phone number. In addition, the third party media streaming service [903] may also respond with the PIN number challenge.

In one embodiment, the ASP [901] acts on the commands from the call manager [905] that either controls the media stream from the service provider (e.g. skip to next track, repeat current track) or cause the ASP [901] to interrupt the stream and inject content directly (e.g. stream an audio encoded version of the current news headlines, stream an audio encoded version of the weather in a specified location) to the call manager [905]. In one scenario, a user may skip the provisioned media during the call process. Then, the call manager [905] may indicate that certain media content has been skipped and may request for additional media content from the list maintained by the third party media streaming service [903]. Then, the third party media streaming service [903] may store the updated user preference information for future media selection and collection process. This adaptive function of ASP [901] acknowledges the change in the pattern of user preference with regards to certain media content. In another embodiment, the ASP [901] maintains a list of content provided to the listener, and content that is skipped, or repeated. Then, the ASP [901] uses this information to determine a pattern for requesting future content from the third party media streaming service to match the listener's preferences. This information may be shared with the third party media streaming service [903] for updating the listener's profile for when they obtain content through a mechanism other than OHMS.

In one embodiment, a database of streamed content is maintained by the ASP [901] to allow any necessary royalty payments to be calculated, and communicated to the content provider if not already managed by the third party media streaming service [903]. In another embodiment, the ASP [901] allows interaction through a published API to the Call Manager [905]. This enables multiple vendors of call manager software to implement the OHMS function in their product offering.

Figure 10A:
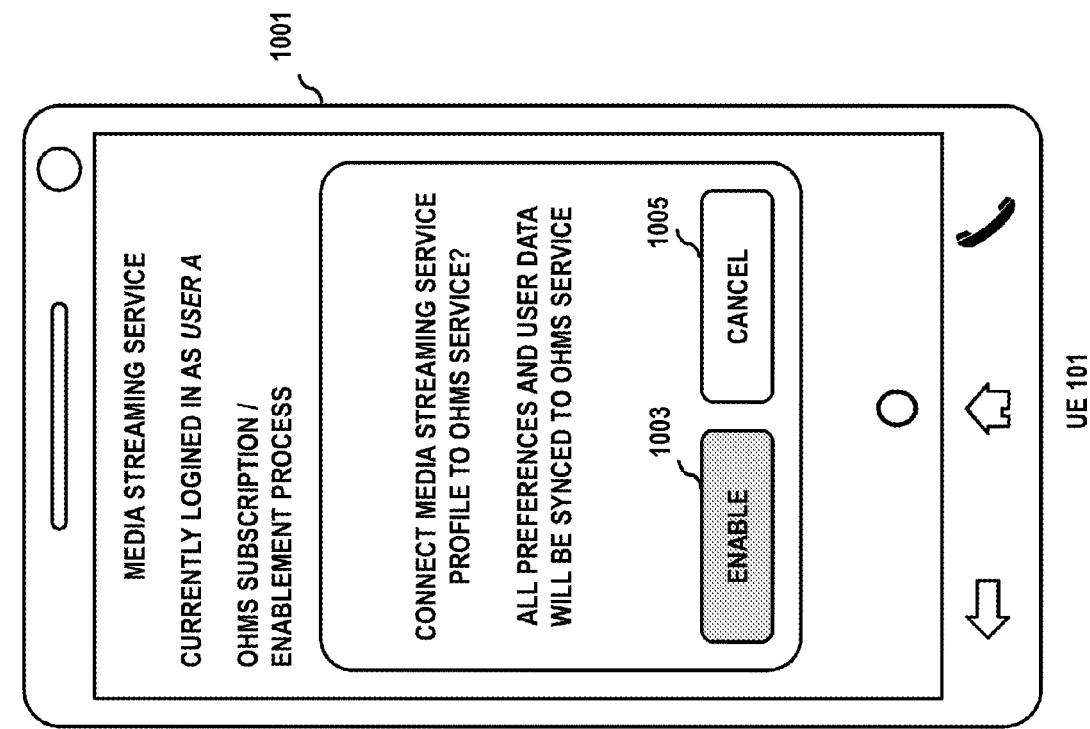
FIGS. 10A-B are user interface diagrams that represents a scenario wherein a user is registering and activating OHMS subscription, according to one example embodiment.
Figure 10B:
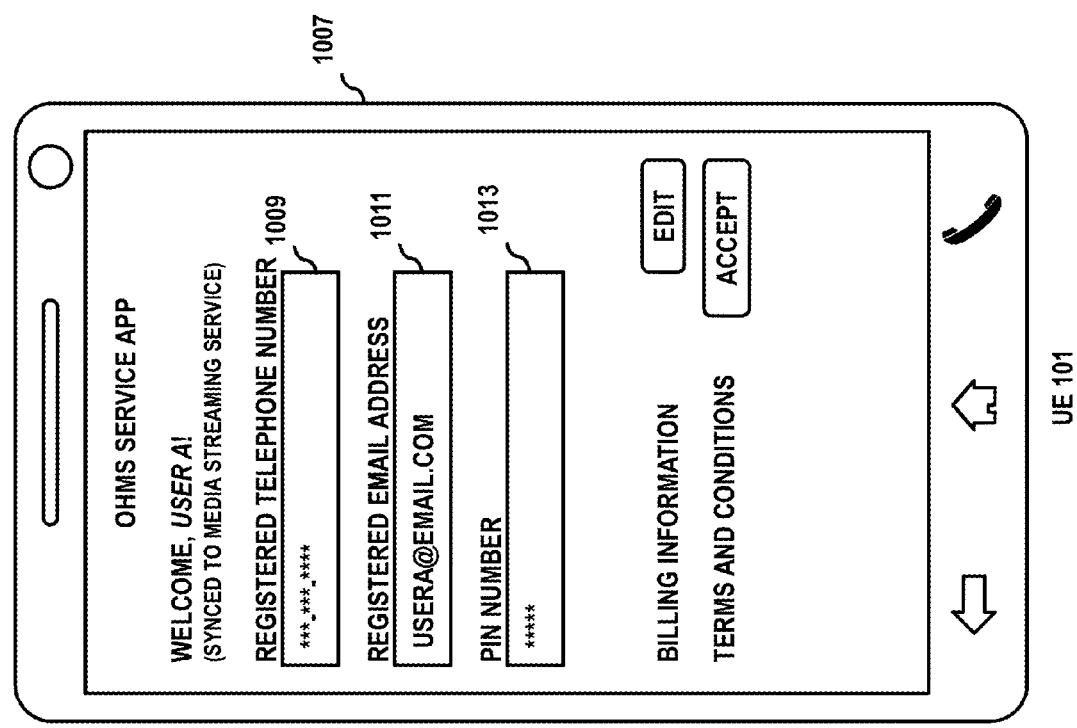

FIGS. 10A-B are user interface diagrams that represents a scenario wherein a user is registering and activating OHMS subscription, according to one example embodiment. In one scenario, a caller dialing into a conference bridge is commonly played music over the telephone line while they are waiting for the conference to start. The music played during the hold period is usually chosen by the conferencing service, and does not consider the preferences of the listener. To avoid playing of arbitrary music, a user may optimize the media services while being placed on hold by registering with the OHMS. In one scenario, a user may access subscription process for OHMS via the portal offered by a third party media streaming service [1001]. The user may be prompted to connect to OHMS while accessing a third party media streaming service, whereupon user preference information and/or user data is transmitted to OHMS. In one example embodiment, a user may check-box on their third party media streaming service account to subscribe to OHMS. This can be done either through a web portal (e.g. an account maintenance screen for a service) or through an application 103 in a UE 101 where a user may check-box to denote the service a user would like to receive. The user may activate the subscription to OHMS via touch based interaction with the graphical user interfaces (GUIs) [1003. 1005]. In another scenario, a user may be notified to enter user information to register with OHMS [1007]. The user may provide his phone number [1009], email address [1011], pin number [1013], billing information, etc. Pursuant to subscription, the user on hold hears music per their preference, since the music is tailored per their liking. At that point, any necessary billing information may be retrieved, or any terms and conditions that need to be changed in the user's agreement for receiving the OHMS may be displayed.

The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software. The computer system 1100 may further include a Read Only Memory (ROM) 1107 or other static storage device coupled to the bus 1101 for storing static information and instructions for the processor 1103.

Figure 11:
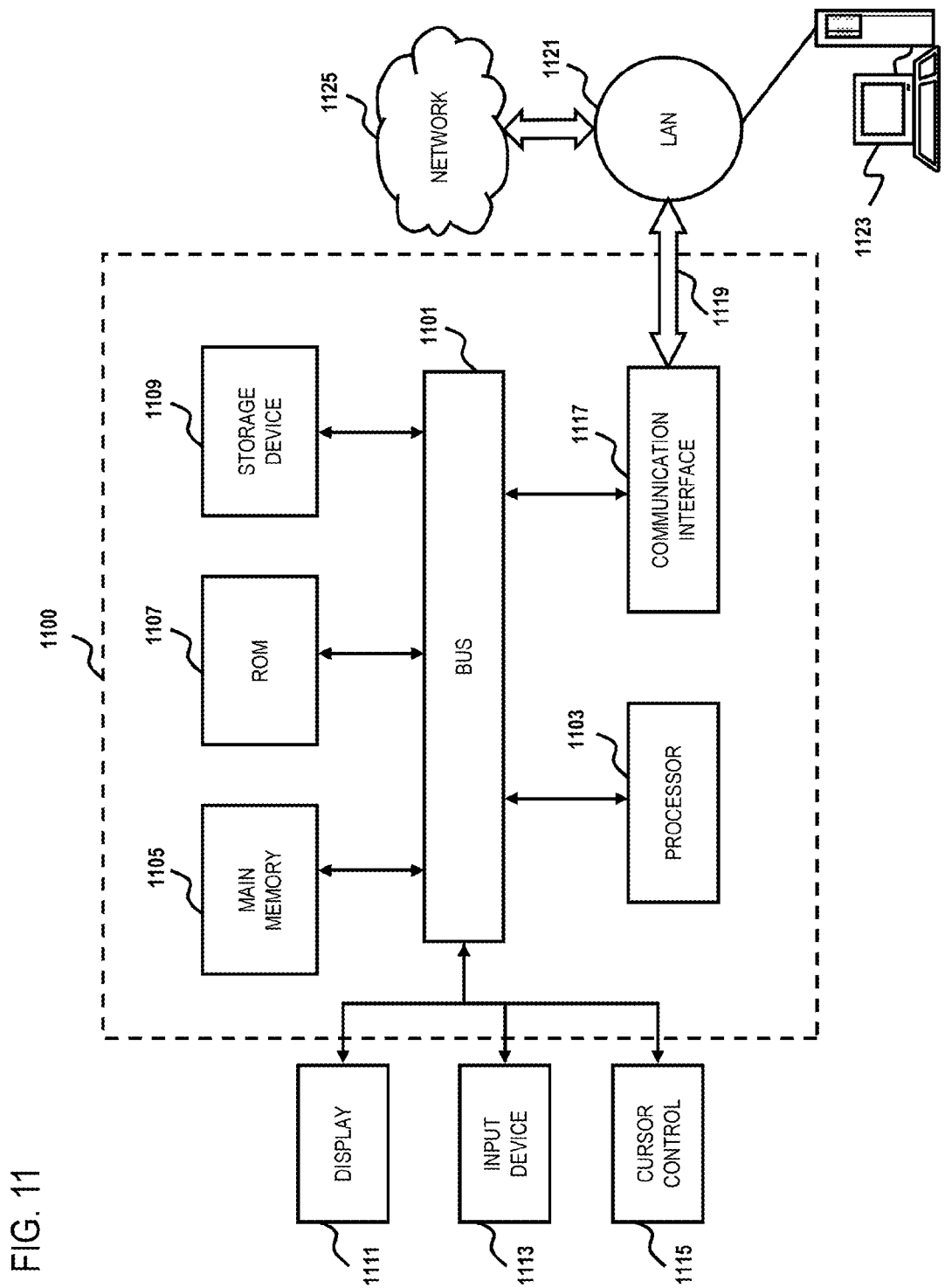
FIG. 11 is a diagram of a computer system that can be used to implement various exemplary embodiments.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit a requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 12 illustrates a chip set 1200 upon which an embodiment of the invention may be implemented. Chip set 1200 is programmed to present a slideshow as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. [3-6].

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1205 also stores the data associated with or generated by the execution of the inventive steps.

While certain exemplary embodiments and implementations have been described herein, other embodiments and modifications will be apparent from this description.

Accordingly, the invention is not limited to such embodiments, but rather to the broader scope of the presented claims and various obvious modifications and equivalent arrangements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining that a device has been placed on a hold status during a communication session;
   identifying music preference information associated with the device;
   identifying a particular media item, based on the music preference information;
   presenting the identified particular media item to the device as hold media during the hold status;
   receiving an input to replay or to skip the particular media item;
   determining a pattern in a media access history associated with the device, the pattern including the received input to replay or skip the particular media item; and
   modifying the music preference information based on the determined pattern, wherein the modified music preference information is used to select future media items to be presented to the device during the hold status or during a hold status during a future communication session.

2. The method of claim 1, further comprising:
   presenting a challenge request at the device;
   receiving a response to the challenge request; and
   determining that the device is registered with a hold music service, the presenting of the particular media item being performed based on the determining that the device is registered with the hold music service.

3. The method of claim 1, wherein the input is received as a voice input, a keypress input, a touch input, a gesture input, or a combination thereof.

4. The method of claim 1, further comprising:
   determining profile information or contextual information associated with the device,
   wherein the particular media item is identified further based on the profile information or the contextual information.

5. The method of claim 1, wherein the music preference information is further based on a media playback history associated with a third party music service.

6. The method of claim 1, further comprising:
   identifying a communication identifier associated with the device; and
   determining, based on the communication identifier, that the device is registered with a hold music service, the presenting of the particular media item being performed based on determining that the device is registered with the hold music service.

7. The method of claim 6, further comprising:
   querying the hold music service, using the communication identifier, to determine whether the device or the communication session is registered with the hold music service.

8. An apparatus comprising a processor configured to:
   determine that a device has been placed on a hold status during a communication session;
   identify music preference information associated with the device;
   identify a particular media item, based on the music preference information;
   present the identified media item to the device as hold media during the hold status;
   receive an input to replay or to skip the particular media item;
   determine a pattern in a media access history associated with the device, the pattern including the received input to replay or skip the particular media item; and
   modify the music preference information based on the determined pattern, wherein the modified music preference information is used to select future media items to be presented to the device during the hold status or during a hold status during a future communication session.

9. The apparatus of claim 8, wherein the processor is further configured to:
   present a challenge request at the device;
   receive a response to the challenge request; and
   determine that the device is registered with a hold music service, the presenting of the particular media item being performed based on the determining that the device is registered with the hold music service.

10. The apparatus of claim 8, wherein the input is received as a voice input, a keypress input, a touch input, a gesture input, or a combination thereof.

11. The apparatus of claim 8, wherein the processor is further configured to:
    determine profile information or contextual information associated with the device,
    wherein the particular media item is identified further based on the profile information or the contextual information.

12. The apparatus of claim 8, wherein the music preference information is further based on a media playback history associated with a third party music service.

13. The apparatus of claim 8, wherein the processor is further configured to:
    identify a communication identifier associated with the device; and
    determine, based on the communication identifier, that the device is registered with a hold music service, the presenting of the particular media item being performed based on determining that the device is registered with the hold music service.

14. The apparatus of claim 13, wherein the processor is further configured to:
    query the hold music service, using the communication identifier, to determine whether the device or the communication session is registered with the hold music service.

15. A non-transitory computer-readable medium storing processor-executable instructions, which, when executed by one or more processors, cause the one or more processors to:
    determine that a device has been placed on a hold status during a communication session;
    identify music preference information associated with the device;
    identify a particular media item, based on the music preference information;
    present the identified media item to the device as hold media during the hold status;

receive an input to replay or to skip the particular media item;
determine a pattern in a media access history associated with the device, the pattern including the received input to replay or skip the particular media item; and
modify the music preference information based on the determined pattern, wherein the modified music preference information is used to select future media items to be presented to the device during the hold status or during a hold status during a future communication session.

16. The non-transitory computer-readable medium of claim 15, further comprising processor-executable instructions to:
present a challenge request at the device;
receive a response to the challenge request; and
determine that the device is registered with a hold music service, the presenting of the particular media item being performed based on the determining that the device is registered with the hold music service.

17. The non-transitory computer-readable medium of claim 15, wherein the input is received as a voice input, a keypress input, a touch input, a gesture input, or a combination thereof.

18. The non-transitory computer-readable medium of claim 15, wherein the music preference information is further based on a media playback history associated with a third party music service.

19. The non-transitory computer-readable medium of claim 15, further comprising processor-executable instructions to:
identify a communication identifier associated with the device; and
determine, based on the communication identifier, that the device is registered with a hold music service, the presenting of the particular media item being performed based on determining that the device is registered with the hold music service.

20. The non-transitory computer-readable medium of claim 19, further comprising processor-executable instructions to:
query the hold music service, using the communication identifier, to determine whether the device or the communication session is registered with the hold music service.

* * * * *